United States Patent
Rhoades et al.

[11] Patent Number: 5,517,124
[45] Date of Patent: May 14, 1996

[54] STYLUS PROBE FOR MEASURING WORKPIECE SURFACE CHARACTERISTICS

[75] Inventors: Lawrence J. Rhoades, Pittsburgh; Ralph L. Resnick, Slickville; John R. Rose, Pittsburgh, all of Pa.

[73] Assignee: Extrude Hone Corporation, Irwin, Pa.

[21] Appl. No.: 289,266

[22] Filed: Aug. 11, 1994

Related U.S. Application Data

[63] Continuation-in-part of Ser. No. 681,734, Apr. 8, 1991, abandoned, which is a continuation-in-part of Ser. No. 557,021, Jul. 25, 1990, Pat. No. 5,155,646.

[51] Int. Cl.⁶ ........................................ G01R 27/26
[52] U.S. Cl. .................. 324/662; 324/690; 33/503; 33/559
[58] Field of Search ........................ 324/662, 663, 324/671, 687, 684, 690, 457, 458; 33/503, 558, 559, 561; 340/686

[56] References Cited

U.S. PATENT DOCUMENTS

| | | | |
|---|---|---|---|
| 4,333,238 | 6/1982 | McMurtry | 33/504 |
| 4,409,541 | 10/1983 | Richards | 324/505 |
| 4,498,043 | 2/1985 | Heathcote | 324/662 |
| 4,764,722 | 8/1988 | Coughlin et al. | 324/72.5 |
| 4,794,321 | 12/1988 | Dotsko | 324/661 |
| 4,823,071 | 4/1989 | Ding et al. | 324/662 |
| 5,155,444 | 10/1992 | Green et al. | 324/662 |
| 5,189,377 | 2/1993 | Rhoades et al. | 324/662 |
| 5,270,664 | 12/1993 | McMurtry et al. | 324/687 |

*Primary Examiner*—Kenneth A. Wieder
*Assistant Examiner*—Glenn W. Brown
*Attorney, Agent, or Firm*—Waldron & Associates

[57] ABSTRACT

A stylus probe with both a contact sensing and a capacitive proximity sensing capability provided by positioning a capacitive sensor means (10) on the tip-end of a grounded, thin conductive stainless steel tube (12) so that the capacitive sensor means (10) is electrically insulated from the grounded tube, and a conductive lead wire (16), conductively attached to the capacitive sensor means (10), extends through the tube (12) with an electrically insulative material (18) dispersed between the tube (12) and the lead wire (16) to electrically insulate and space the lead wire (16) from the tube (12). The connecting-end of the tube (12) has an elastomer material (20) and (22) placed in an annular fashion and in direct contact with a mounting means and the tube (12) so as to dampen vibrations of the tube (12) caused by probe deflection. The stylus probe further comprises a tubular member with a length:width ratio of from about 40:1 to about 300:1 to give up to a 45° deflection capability thus avoiding damage to probe and workpiece while functioning as a contact probe.

20 Claims, 2 Drawing Sheets

STYLUS PROBE FOR MEASURING WORKPIECE SURFACE CHARACTERISTICS

This is a continuation-in-part of U.S. Ser. No. 07/681,734, filed Apr. 8, 1991, now abandoned which is in turn a continuation-in-part of U.S. Ser. No. 07/557,021, filed Jul. 25, 1990, and now U.S. Pat. No. 5,155,646.

BACKGROUND OF THE INVENTION

1. Field of the Invention

The present invention relates to a new and improved stylus probe that combines contact and capacitance capability for measuring surface characteristics such as the dimensions and contours of a workpiece requiring a probe having a high degree of sensitivity, resolution and an exceptional degree of adaptability as well as the ability to deflect elastically without any permanent or plastic deformation or bending of the probe.

2. Summary of the Prior Art

Two and three dimensional co-ordinate measuring machines which comprise a head supported for two or three-dimensional motion relative to a workpiece are known in the art. The movable head supports a stylus probe which is generally in the form of a straight rod with a small contact ball at the tip disposed away from the head. The machine includes a plurality of drive means for moving the head with the probe in two or three co-ordinate axes, and a monitoring means for instantly monitoring and recording the position of the probe with reference to the co-ordinate axes. A means is also provided for generating a signal when the probe comes into contact with the workpiece. When the probe is deflected, the driving motion of the probe is stopped and its position is recorded.

The co-ordinate measurements of a workpiece mounted to the co-ordinate measuring machine are determined by moving the head in one or more directions and reading the co-ordinate position of the probe relative to a given datum when the probe contacts the workpiece. State of the art co-ordinate measuring machines are capable of monitoring and recording probe positions to an accuracy of 0.1 mm.

Because the co-ordinate measuring machines of the prior art rely on physical contact to measure the co-ordinate positions of the workpiece surfaces, the operating sequence tends to be rather prolonged and time consuming. In addition, it is generally known that contact probes can be expensive to manufacture and are subject to wear and damage due to physical contact. Even a small amount of wear can introduce significant errors to the machine's accuracy capabilities.

In addition to the above, there are inherent difficulties and inaccuracies built into the prior art system and techniques for determining a contact position which tends to detract from the accuracy capabilities of the co-ordinate measuring machine as a whole. For example, setting the probe to an accurate zero starting position cannot be effected rapidly, as the probe must be brought into contact with the workpiece, and then carefully adjusted so that contact is maintained without probe pressure against the workpiece, or bending or deflection of the probe. A mere light touch contact of the probe against the workpiece is not normally sufficient to activate the stop signal. Rather, the stop signal is effected only after the probe has been deflected or in some way disturbed.

While it would be desirable to stop the motion of the head at the exact instant of probe contact, the contact signal does not normally occur immediately upon contact, and the drive mechanism cannot be stopped instantly upon receipt of the stop signal. Rather, the head continues to move by a minute amount relative to the probe tip before the stop signal can be effected. There is an even further minute initial movement before the stop signal effects a complete stop of the drive mechanism. The result is that the stylus probe is deflected under the operating force necessary to generate and transmit the stop signal, as well as to overcome the momentum of the drive means after the stop signal has been transmitted.

Since such probe deflection is inherent, it is normally taken into account in the measuring process. The amount of relative movement between the head and the probe tip is referred to as the "bending allowance," and is deducted from the distance measured by the machine. To measure from a surface where such a deflection has already occurred, a starting bending allowance must again be deducted from the distance measured or else the probe must be re-set to a proper zero starting point. Accordingly, consecutive measurements of different surface dimensions can be a relatively prolonged and time consuming procedure.

In order to prevent damage to the probe as a result of any bending action, many different types of stylus mounting systems have been devised to permit stylus deflection without permanent deformation. These include a calibrating means for determining the extent of deflection through a variety of complex probe mounting systems. These mounting systems normally comprise a 360 degree pivotal mounting base capable of measuring the extent of deflection and are not only intricate, complex, and costly, but do not achieve the degree of exacting measurements desired. Further, the mounting system can be damaged or knocked out of adjustment by the probe's impact with a workpiece surface, or merely by being accidently bumped by the operator.

As distinguished from contact probes, non-contacting capacitance probes have been utilized in prior art techniques for measuring conductive workpiece surface dimensions and characteristics. Capacitance probes afford the ability to determine the location of an adjacent workpiece surface without the need to contact the surface because a given capacitance value can be equated to a predetermined spacing, known as a "null point", between the probe and workpiece. Such probes have established a highly useful role in industrial manufacturing and in the machine tool industry for the characterization of surface properties and dimensions. These detectors are based on the employment of a variable capacitance due to the coupling of the detector with a conductive surface to be evaluated by techniques such as controlling the rate of an oscillator circuit, so that the frequency of the oscillator is directly determined and altered as a function of surface characteristics or distance from the probe.

Such capacitance probes are often utilized in combination with machine tools, such as a lathe or a milling machine for determining conformity of a machined workpiece with specifications before the workpiece is removed from the machine tool. Any incomplete machining detected by the capacitance probe can then be corrected before the workpiece is removed from the machine tool.

Most of the prior art practices utilizing capacitance detecting probes are based on the use of probes that incorporate a plurality of capacitor detectors so that the differences in capacitance, as measured by the various detectors, is a function of the workpiece surface characteristic sought.

U.K. Patent No. 2,100,441, to Wofendale, teaches a number of methods of determining the contour of an unknown conductive surface or a diameter of a bore utilizing a non-contacting probe, which comprises a probe having a plurality of capacitor sensors positioned at or near the probe tip. Differences in the measured capacitance between the workpiece surface and the various sensors provide data corresponding to the spacing between the workpiece and the sensors. Such capacitance probes having multiple sensors as taught in Wofendale usually comprise a cylindrical body portion such as a tubular body with the multiple sensors exposed through one or more side wall portions, and accordingly do not have any significant degree of compliance or flexibility. Wofendale does not teach or suggest a flexible metallic tubular stylus probe that can be used as both a capacitance and contact probe. He also does not teach a probe wherein vibrations, caused by a hard contact with a workpiece, can be dampened with the use of an elastomer in direct contact with a tubular member of the probe. Unlike the present invention, Wofendale does not teach interchanging both capacitance and contact probe capabilities. Nor does he teach or suggest the use of an environmental probe to give more accuracy to the ultimate capacitance data.

U.S. Pat. No. 4,816,744, to Papurt, et al., teach a process and apparatus for measuring an inside dimension of a workpiece, such as a bore diameter. The apparatus positions a single workpiece surface, and then moves the probe to an equal null point adjacent to the other workpiece surface such as diametrically across a bore and then measures the distance of the probe movement with a laser interferometer. The desired distance or diameter is then determined to be the distance traveled by the probe plus the two stand-off distances as established by the null point capacitance. Since contact with the workpiece is not intended, the probe depicted in the patent is a short and rigid stylus probe which does not appear to have any conformity or flexibility characteristics. Papurt, et al., do not teach or suggest a stylus probe that can be used as both a capacitance and contact probe. Further, Papurt, et al., do not teach the use of an elastomer in direct contact with a tubular member of the probe, the elastomer having a dampening effect on the vibrations of the stylus probe. Nor does he use an auxiliary environmental probe to measure environmental interferences. Papurt, et al., do not teach or suggest a probe that can be used in both contact and capacitance modes.

U.S. Pat. No. 4,333,238 to McMurtry, teaches a coordinate measuring machine adapted to move a probe relative to a workpiece to be measured, the measurement being determined by an electronic sensor on the carriage, actuated by deflection of the probe when it contacts the workpiece. The invention provides an accelerometer to determine the acceleration and, derivatively, the deflection of the probe, the probe's defection measured in micrometers, with a computer arranged to determiner the true measurement by adjusting for the deflection and making a proper calculation. McMurtry does not suggest or teach a stylus probe deflection capability of up to 45° nor does McMurtry teach the use of an elastomer to dampen the vibrations caused by the deflection of said probe. Further, McMurtry does not teach the use of an auxiliary environmental probe to more accurately measure capacitance nor does the McMurtry probe have both capacitance and contact capabilities.

U.S. Pat. No. 5,065,103 to Slinkman, et al., is an apparatus and method for generating microscopic scan data of C-V and/or dC/dV over a scan range. A scanning force microscope is provided with a voltage biased tip of tungsten which is scanned across an area to derive data. By analyzing voltage and capacitance data, a profile of material properties are determined, such as a plot of semiconductor dopant level across the scan area, carrier generation and recombination rates, and subsurface defects. Slinkman, et al., do not teach or suggest a stylus probe or method that can be used in either a capacitance or contact mode. He does not teach the dampening of probe vibrations by the use of an elastomer in direct contact a tubular member of the probe. Further, Slinkman, et al., do teach the use of an auxiliary environmental sensor in determining the accuracy of capacitance, but not the use of a highly flexible probe capable of a 45° deflection without bending. Slinkman's teachings are not applicable to coordinate measurement machines.

U.S. Pat. No. 4,296,371 to Keizer, et al., provides a system for measuring shoe length of a stylus adapted to track a path along a surface of a video disc by positioning the tip of the stylus adjacent the surface if a substrate having a signal for effecting capacitive variations between the stylus and the substrate in a first position. The stylus is then tilted an angle of 0 degrees relative to the substrate, whereby the stylus and substrate are oriented in a second position relative to each other. The capacitive variations are then measured with a comparison made between the two stylus positions. Keizer, et al., do not teach or suggest a stylus probe that has the capability of both capacitance and contact functions, nor do Keizer, et al., teach the use of an elastomer in direct contact with the probe to dampen vibrations of the probe. Further, Keizer, et al., do not teach the use of an environmental probe to give greater accuracy in the measurement of capacitance. Keizer, et al., has no applicability to a coordinate measurement machine.

Since capacitance probes are not intended to contact the workpiece surface in order to make a measurement determination, there is no need to determine any bending allowance, and therefore, capacitance probes are normally rather inflexible structures rigidly secured to the motion machine such as a co-ordinate measuring machine or a machine tool. However, in normal use a probe may be subjected to occasional impact with the workpiece by accident, such as when the workpiece is being mounted to the measuring machine or machine tool, or accidently bumped by the operator when the probe is mounted to a machine tool. Therefore, while the probe is not intended to contact the workpiece and there is no need to determine any degree of deflection, it has become apparent that the stylus probe should have some degree of elastic flexibility so that it will not be permanently bent or knocked out of adjustment if it is accidentally impacted or bumped.

In addition to the above considerations, the capacitance stylus probes of the prior art, particularly those having a single sensor element, have not had a significantly high degree of sensitivity and resolution, due to various factors. These factors are: 1) the capacitance effects on the stylus stem or portions of the probe other than the sensor itself, 2) stray capacitance and 3) environmental conditions such as temperature, humidity, atmosphere, and external electrical noise such as electromagnetic interference and radio-frequency interference, and the proximity of conductive bodies may affect the capacitance measured by the sensor itself, which will introduce errors into the measured capacitance being sought. Prior art capacitance sensors have not been compatible with the 0.1 mm accuracy capabilities of state of the art co-ordinate measuring machines.

SUMMARY OF THE INVENTION

The present invention provides a new and improved stylus probe having both contact and capacitance measuring capability with a high degree of sensitivity, resolution and adaptability. This new probe has the ability to deflect elastically without any permanent or plastic deformation or bending which could adversely affect the probe's mounted position or knock it out of adjustment. When in use as a contact or trigger probe, this design protects the probe and workpiece from inadvertent damage. In the capacitive mode, the degree of sensitivity and resolution are achieved by using a small, highly precise and reactive sensor tip whereby the conductive lead wire is insulated and shielded by passing the conductive wire through a conductive and grounded tubular stylus stem. The material used to electrically insulate the conductive wire also contributes to a dampening effect of the probe when probe vibrations occur through deflection. The stylus stem and the sensor lead wire are not capable of adversely affecting the capacitance measured by the sensor. These advantageous properties are the result of utilizing a thin metallic material as the tube for the stylus stem, the material having a high degree of elasticity which provides a high degree of elastic bendability without permanent or plastic deformation.

At the connecting-end of the elastic metallic tubing is an elastomer material arranged as either an annular element wrapped around the tubing and in contact with the mounting means to provide a dampening effect on vibrations. In another embodiment, the elastomer material can be packed with direct contact with the tubing and the mounting means to achieve the same results. The elastomer material can vary in modulus and thus reduce the hysterisis rate of the elastomer thereby increasing the dampening effect on the stylus probe.

DETAILED DESCRIPTION OF THE INVENTION

Figure 1:
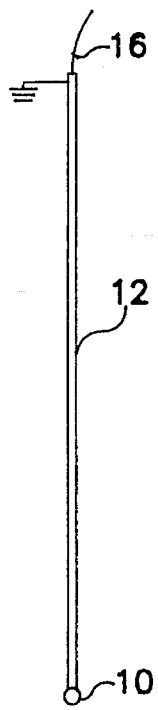
FIG. 1 is a side view of the stylus probe particularly suitable for measurements in two co-ordinate planes.
Figure 4:
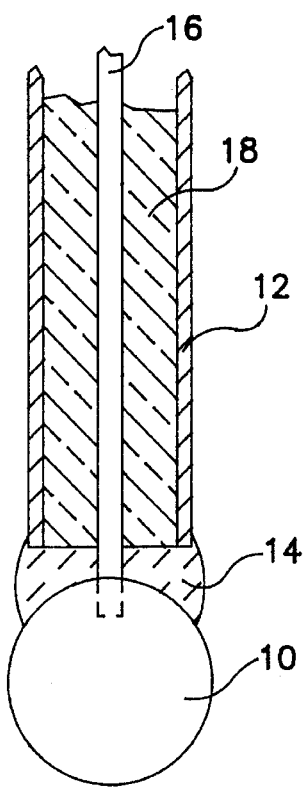
FIG. 4 is an enlarged partial cross-sectional view of the tip end of the stylus probe shown in FIG. 1.

FIGS. 1 and 4 illustrate a basic embodiment of the stylus probe useful for general purpose applications, and particularly for workpiece measurements in two co-ordinate planes. The probe shown in FIGS. 1 and 4 comprises an elongated stylus tube (12) with a connecting-end, a tip-end and a spherical metallic capacitor sensor (10) at the tip-end. The stylus tube (12) is made of a rigid conductive metal such as stainless steel, having a high degree of bending flexibility. The capacitor sensor (10) is also made of a conductive metal having a highly conductive, non-corrosive, surface plating, such as gold. The sensor (10) is bonded in a spaced relationship to the tip-end of the stylus tube (12) by a non-conductive bonding material (14), such as an epoxy resin, so that the sensor (10) is electrically insulated from the stylus tube (12). A rigid conductive lead wire (16) is secured to the sensor (10), and extends from the sensor (10) through the axial center of the stylus tube (12) to the connecting-end of the tube. An insulating material (18), such as rubber or a rubber like polymer, is uniformly dispersed around the conductive wire (16) to electrically insulate and space the conductive wire (16) uniformly from the conductive cylindrical interior surfaces of the stylus tube (12). In addition, this insulative material also provides a dampening effect on probe vibrations.

When properly mounted for use at the connecting-end, the conductive stylus tube (12) should be grounded so that in operation, it will shield the conductive wire (16) from any stray capacitance caused by the workpiece or environmental influences. These influences can introduce errors in reading the capacitance as measured by the sensor (10). Grounding of the stylus tube (12) can normally be affected by securing the stylus to the grounded head of the co-ordinate measuring machine or machine tool so that its outer conductive surface is secured to the grounded machine.

For most practical applications, the sensor (10) should preferable have a diameter of about 0.8 to 2 mm, with the stylus tube (12) having a diameter somewhat less than that of the sensor (10). Preferably, the stylus tube (12) has an outside diameter (OD) of about 0.8 mm with an inside diameter (ID) of from 60 to 90 percent of the OD. The overall length of the probe will normally be from 40 to 300 mm. While the maximum length is not critical, the minimum length should be at least 40 mm, and preferably 100 mm, to achieve the flexibility desired.

The spherical configuration of the sensor (10) is preferred for multiple applications as a good general purpose detector. However, the sensor (10) can be of various sizes and alternate configurations as may be required for any specific purpose or use. For example, the sensor (10) may be in the form of a pointed tip if an exceptionally small workpiece is being measured. It may also have other shapes as required.

Since resolution of the capacitance measurements taken will be dependent on the size of the sensor element and its precision to geometric configuration, the size of the sensor (10) is desirably as small as practicable for the application, and as precise as to be consistent with the intended use and desired result.

The sensor (10) is made of either a conductive or semi-conductive, non-magnetic material, such as copper, aluminum, alloys thereof, or austenitic stainless steel. Semi-conductive materials such as carbide, silicon or the like, may also be used. While not essential, it has been found to be highly preferred that the surface of the sensor (10) be plated with a non-corrosive, highly conductive metal such as gold. This will serve to protect the sensor surface from atmospheric and human handling corrosion and will optimize the conductivity and sensitivity of the sensor in its role of measuring capacitance. A good conductive interface between the gold plating and the conductive base metal is essential. Contact probes should have tips which are hard and wear resistant, made from materials such as stainless steel and the like.

The stylus tube (12) is tubular in form, non-magnetic and conductive. The tubular material should have a high degree of elastic-bending flexibility without being stiff but with a yield strength high enough to permit such flexure without any plastic deformation or fracture. Commercially available austenitic stainless steels, titanium, titanium alloys or berillium-copper alloys in small tubing sizes are satisfactory for this purpose. Austenitic stainless steels or titanium are preferred in order to impart atmospheric and handling corrosion resistance of the stylus tube (12).

Elastic deflection of the stylus tube (12) is achieved by using a small sized steel tube, preferably an austenitic stainless steel tube of 0.8 mm OD and an ID of 60 to 90 percent of the OD. A straight, 100 mm length of the 0.8 mm OD, 0.5 mm ID stainless steel tubing exhibits an exceptional degree of flexibility and can be deflected to an elastic deflection angle of at least 45° without excessive force or permanent plastic deformation or set. A length:diameter (L:D) ratio of the probe from 40:1 to 300:1 is the range at which a variable amount of flexibility of the probe can be effectively attained.

Since the stylus tube (12) may be subjected to flexing while in service, the insulative material (18) within the stylus tube (12), used to space and electrically insulate the conductive wire (16) from the walls of the stylus tube (12), should not only be non-conductive and have sufficient rigidity to maintain the conductive wire (16) at the axis of the stylus tube (12), but should also have sufficient flexibility to be able to flex with the stylus tube (12) without cracking or becoming deformed. The material used also has a dampening effect on vibrations created in the probe when the probe is flexed and released. For this purpose, rubber, a rubber-like polymer, elastically compressible polymer foam materials, or a comparable resilient material can be used which will dampen the vibrations of the tubular member.

Figure 2:
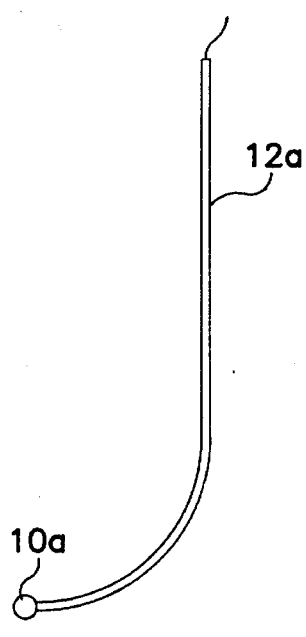
FIGS. 2 and 3 are similar to FIG. 1 in that they illustrate two modifications of stylus stems and detector tips, suitable for different applications.
Figure 3:
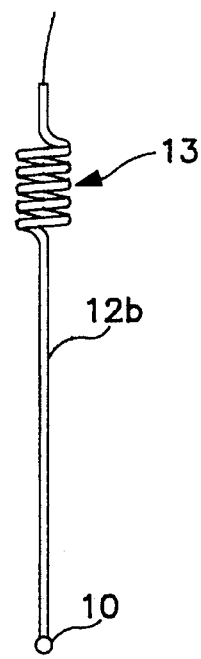

FIGS. 2 and 3 illustrate other embodiments of the stylus probe which are substantially identical to that shown in FIG. 1 except for the geometric configurations of the stylus tubes and the sensors. The stylus tube (12A) shown in FIG. 2 is provided with a curved body portion, the curve beginning at about one-third distance from the tip-end, which is better suited when making co-ordinate measurements in three dimensional planes. This shape probe provides some degree of elastic flexibility in the z axis, unlike the stylus probe shown in FIG. 1. While the z axis flexibility is preferred with regard to contact or trigger probes wherein the probe must make physical contact with the workpiece in the z axis, such a configuration is not essential in the case of the capacitance sensors, since the probe is not intended to contact the workpiece in any co-ordinate plane. The elastic flexibility is provided only for purposes of preventing damage to the probe in the event of accidental contact or bumping. FIG. 2 also shows an alternate embodiment of the sensor in depicting a pointed sensor (10A) that is more suitable for making small and intricate measurements.

FIG. 3 illustrates an another embodiment of the stylus probe of this invention which is substantially identical to that shown in FIG. 1 except that the stylus tube (12B) is provided with a helically wound portion (13) at the connecting-end of the probe. The helically wound portion (13) provides an enhanced degree of elastic bendability which is ideal in applications where there is a greater probability of significant accidental contact or bumping of the probe. The degree to which the probe can be elastically deflected will depend upon the length, pitch and radius of the spiral portion of the probe.

In view of the embodiments shown in FIGS. 1–3, it should be apparent that the exact geometric configurations of the stylus tube and detector are not critical and can be varied significantly depending upon the specific application in which the probe will be utilized.

Although the sensor (10) can be any desired size, small detectors such as those having a diameter of 1 to 2 mm have an exceptionally high degree of sensitivity and resolution and are capable of measuring capacitance over small areas of the workpiece surface. Since the elongated lead wire from the sensor (10) comprises a conductive wire (16) which is passed through the grounded stylus tube (12) and is spaced and insulated from the grounded walls of the stylus tube (12), neither the conductive wire (16) nor the stylus tube (12) is subject to any capacitance which will affect the capacitance reading of sensor (10). Therefore, the sensor's sensitivity and resolution are greatly enhanced to yield a capacitance probe having a greater sensitivity and resolution than any capacitance probe known in the prior art, and is compatible with the 0.001 mm accuracy capabilities of the prior art co-ordinate measuring machines. Resolution of the capacitance measurements taken will be dependent on the size of the detector element and its precision to geometric configuration. Therefore, the size of the detector should be as small as practical for the application, and formed with precision as exacting as is necessary so as to be consistent with the intended use and desired results.

To take full advantage of the high degree of sensitivity and resolution of the capacitance probe of this invention, it has been found that in addition to the above probe construction, additional corrective measures are required to correct all capacitance measurements to the actual capacitance of the coupling. These include eliminating any capacitance effected by environmental influences such as temperature, atmosphere, humidity, and external electrical noises such as electromagnetic and radio frequency interferences. It has been found that adequate corrective means can be achieved by providing the two corrective means illustrated in FIG. 5.

As a first corrective step, the processor-controller (46) to which the capacitance conductive wire (16) is connected at the connecting-end of the probe, must be shielded from environmental influences. This can be effected by physically shielding the circuitry within a controlled environment by placing the circuitry within a grounded conductive container. This will shield the circuitry from external noise, external contaminants such as dirt, humidity and other external capacitance influences.

The container may itself be the head of a co-ordinate measuring machine, a container within or mounted on such a head. While the interior of the container can be maintained at a constant temperature and humidity for ultimate accuracy, it is adequate if the circuitry is protected by a good thermal insulator. Metal is not an adequate thermal insulator, and good thermal insulators are not normally suited for electrical noise shielding. One exemplary solution is to wrap the circuitry in a grounded metal foil housed in a thermal insulating container such as nylon.

As a second corrective step, the probe sensor itself must be corrected to account for environmental capacitance. For example, temperature changes will cause minute changes in the overall capacitance sensed by the sensor, as will the proximity of conductive bodies such as structural members of the co-ordinate measuring machine or a machine tool itself. To correct for this capacitance reading, a second environmental probe with a sensor is provided in the vicinity of the main probe, but displaced towards the connecting-end of the probe, more distant from the workpiece so that it is not influenced significantly by the workpiece. In this way, the environmental probe measures capacitance as it is primarily effected by the environment. To determine the actual capacitance between the main probe sensor and the workpiece, the environmental capacitance recorded by the environmental probe sensor is subtracted from the capacitance recorded by the main probe sensor.

Figure 5:
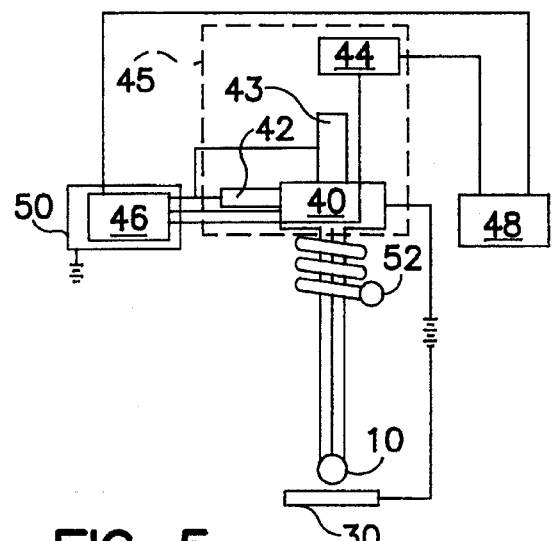
FIG. 5 is a schematic view of a stylus probe as secured to the head of a co-ordinate measuring machine incorporating an environmental probe.

FIG. 5 illustrates an environmental probe (52) which comprises a helically wound stylus having a sensor at the tip-end, and placed around the stylus tube (12) at the connecting-end, just below the point where the stylus tube (12) is joined to the head of the co-ordinate measuring machine or container (40). It is preferred that the environment effect a capacitance on each probe which is as close as possible to being identical, so that the capacitance subtracted, as measured by the environmental probe, is equal to the environmental capacitance effected at the measuring probe sensor (10). Therefore, the physical parameters of the environmental probe (52), at least as to the size and structure of the sensor, should be substantially the same as the main probe sensor (10). Because of different orientations and mechanical shapes, the thermal time constants will not be identical, so that corrective fine tuning will normally have to be included to correct for any differences in overall capacitance effects. Such fine tuning is within the skill of the art and need not be discussed here.

Excellent results have been achieved by using an environmental probe identical to the main probe in terms of materials, fabrication and dimensions. The only difference is that the stylus tube of the environmental probe (52) is wound in a helical configuration, with a connecting-end and a tip-end, and mounted as shown in FIG. 4. Hardware for measuring the two capacitance readings and subtracting the environmental capacitance from the capacitance measured by the sensor (10), is described in the art.

FIG. 5 further illustrates the stylus probe showing the sensor (10) in close proximity to workpiece surface (30). The probe is secured to the head (40) of a conventional co-ordinate measuring machine (45) which includes a drive means (42) and (43) for driving the head (40) in a two or three co-ordinate axes. The co-ordinate measuring machine (45) also includes a position recorder (44) which continuously records the position of the sensor (10) thus providing a plot of the sensor's path of travel.

While prior art co-ordinate measuring machines typically record the position of the detector only when it has been disturbed by making contact with the workpiece, the practice of the present invention requires a plot of the detector's path so that its position is repeatedly recorded at intervals consistent with the accuracy sought. Hardware is currently available to record as many as 500 positions per second. A processor-controller (46) is also included within a closed loop feedback with the probe which continuously monitors and records the dynamic capacitance value between the sensor (10) and workpiece surface (30), thereby recording a capacitance value for each recorded probe position. The processor-controller (46) then controls the motion of the sensor (10) responsive to the capacitance value received by controlling the drive means (42) and (43). In addition, a processor-computer (48) is provided to determine the surface parameter of the workpiece by receiving data regarding the sensor's recorded path of travel from a position recorder (44), and the recorded capacitance corresponding thereto.

The processor-computer (48) calculates the workpiece parameters by correcting the probe path of travel to account for the stand-off distance as indicated by the correlated capacitance values. The processor-controller (46) and the processor-computer (48) are any suitable analog or digital control means which can be programmed to achieve their functions. Such controls are well-known in the art and need not be further described here.

In view of the above description, it should be readily apparent that this invention provides a very useful capacitance probe for measuring various workpiece parameters with a significant degree of sensitivity, resolution, conformity and resistance to damage. In addition, the exceptional resiliency of the tubular stylus stem disclosed herein will also provide a unique and improved contact or trigger probe having an improved degree of conformity and resistance to damage in contrast to the contact probes of the prior art. Such an inventive contact probe could be fabricated substantially in accordance with the structure as described above, except that there would be no need to be concerned with the electrical and capacitance characteristics of the structure. Therefore, any such inventive contact probe does not have to be concerned with the electrical conductivity of the tube or detector. The detector does not need to be electrically insulated from the stylus tube and there is not a need for a lead wire to be passed through the tubular stylus stem. Efforts taken to impart corrosion resistance, however, would be beneficial as would be the use of non-magnetic materials if magnetic workpieces are to be measured. However, the insulative material would still fill the tube hollow even in the absence of the conductive wire because of the materials dampening effect on vibrations of the probe when inadvertently flexed.

Figure 6:
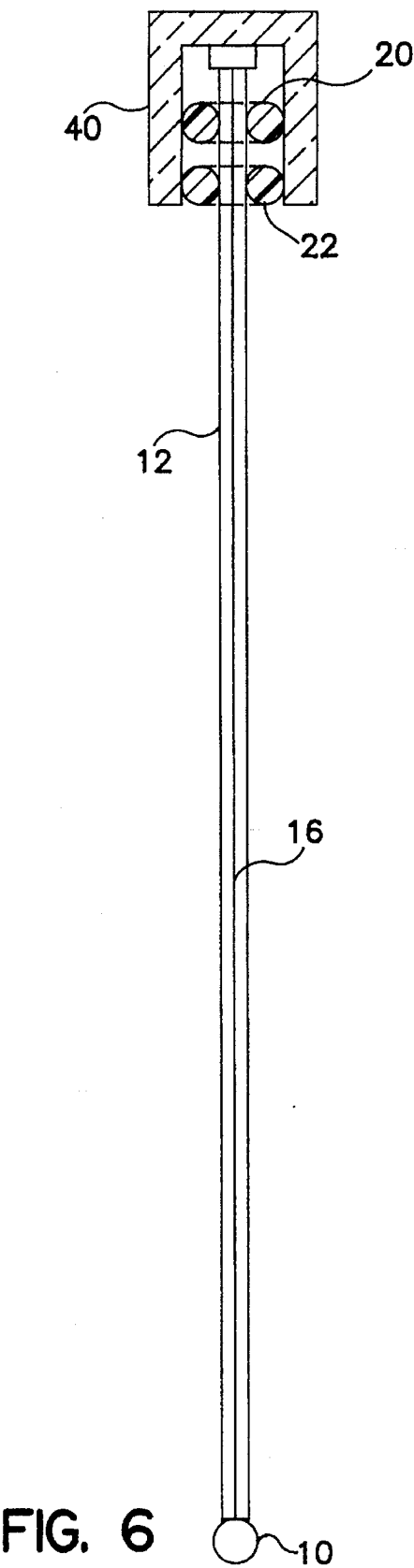
FIG. 6 is a schematic view of the stylus probe showing the use of an elastomer material at the connecting-end of the probe to achieve a dampening effect on probe vibrations.

FIG. 6 illustrates an elastomer material (20) and (22) in an annular application around the stylus tube (12) at the connecting-end of the tube. The elastomer material (20) is placed closer to the connecting-end on the stylus tube (12) than elastomer (22) and may be larger, with less modulus than (22). The addition of an elastomer in direct contact with the mounting means and the stylus tube (12) at the connecting-end aids in dampening vibrations or oscillations of the stylus tube (12). The elastomer materials used may be configured other than in a donut-shape as long as there is direct contact with the mounting means and the stylus tube (12) at the connecting-end. The two separate elastomer materials may have different modulus characteristics, and thus different sites of dampening of oscillations, which insures rapid and effective dampening of the stylus tube. Insulative material (18) also aids in quelling vibrations of the probe because of its elastic properties.

Elastomers that can be used to achieve this dampening effect include: polyureas, polyimides, natural rubber, styrene-butadiene random co-polymers (SBR), polyisoprene, neoprene rubber, polybutadiene, polychloroprene, polybutene, polyurethane rubber, silicone rubber, thiokol rubber, thermoplastic polyesterurethanes and polyureas, thermoplastic polyetherurethanes and polyureas, styrene-butadiene block co-polymers, ethlene-propylene co-polymers and terpolymers, and blends and mixtures thereof.

Finally, although the invention has been described with reference of particular means, material and embodiments, it is to be understood that the invention is not limited to the particulars disclosed and extends to all equivalents within the scope of the claims.

What is claimed is:

1. In a stylus probe for a coordinate measurement machine, said machine including a multiple axis carriage, detector means, and stylus mounting means, said probe adapted to be carried on said carriage for determining surface topography information about an associated workpiece, the improvement comprising:

(a) a stylus comprising a rigid, elongated hollow tubular member, having a length diameter ratio of from about 10;1 to about 500:1 and a sufficient degree of elastic deflection by bending in three dimensions without permanent deformation to absorb carriage overshoot and crash conditions without causing damage to said stylus, said detector means, said mounting means, said carnage means, or an associated workpiece, and having a connecting-end and a tip-end;

(B) mounting means for mounting said connecting-end of said stylus to said multiple axis carriage of said coordinate measurement machine;

(C) detector means, mounted on said tip-end of said stylus probe, for detecting a topographical feature of an associated workpiece;

wherein said probe reproducibly locates said detector means relative to the coordinate measurement system of said machine and an associated workpiece.

2. A probe according to claim 1, wherein the angle of deflection of said probe is up to 45°.

3. A probe according to claim 1, wherein the material of said tubular member is a member selected from the group consisting of austenitic stainless steel, titanium alloys and berillium-copper alloys.

4. A probe according to claim 3, wherein said material is comprised of stainless steel.

5. A probe according to claim 1, wherein said tubular member is conductive.

6. A probe according to claim 1, wherein said tubular member contains an insulative material within the hollow of said member, said material uniformly disposed around said conductive wire.

7. A probe according to claim 6, wherein said material is a member of a group consisting of rubber and a rubber-like polymer.

8. A probe according to claim 1, wherein said detector means is spherically shaped.

9. A probe according to claim 1, wherein said probe is straight.

10. A probe according to claim 1, wherein said probe has a "C"-shaped configuration.

11. A probe according to claim 1, wherein said probe has a helically-shaped configuration.

12. A probe according to claim 1, wherein an elastomer material is positioned against and between said mounting means and said tubular member at the connecting-end portion of said probe, said elastomer being compressed by deflection of said probe and then rebounding, and having a dampening effect on vibrations of said probe.

13. A probe according to claim 12, wherein said elastomer is further comprised of a first segment and a second segment, said segments placed in annular contact between said mounting means and said tubular member, said first and second segments axially separated, said first segment more proximally located to said connecting-end.

14. A probe according to claim 12, wherein said elastomer is a member of a group consisting of polyureas, polyimides, natural rubber, styrene-butadiene random co-polymers (SBR), polyisoprene, neoprene rubber, polybutadiene, polychloroprene, polybutene, polyurethane rubber, silicone rubber, thiokol rubber, thermoplastic polyesterurethanes and polyureas, thermoplastic polyetherurethanes and polyureas, styrene-butadiene block co-polymers, ethlene-propylene co-polymers and terpolymers, and blends and mixtures thereof.

15. A probe according to claim 1, wherein the workpiece is comprised of a conductive material.

16. In a stylus probe for a co-ordinate measurement machine, said machine including a multiple axis carriage, said probe adapted to be carried on said carriage for determining surface topography information about an associated workpiece, wherein the improvement comprises:

(a) an elongated stylus probe means formed of a rigid, elongated, hollow tubular member with a connecting-end and a tip-end;

(b) a mounting means for mounting said connecting-end of said stylus probe means to said multiple axis carriage of said co-ordinate measurement machine;

(c) a capacitive sensor means for measuring capacitance between said probe and a topographical feature of an associated workpiece, said sensor mounted on said tip-end of said stylus probe;

(d) a conductive lead wire connecting said capacitive sensor means, said wire conductively secured to said sensor means and extending through said probe to the co-ordinate measurement machine.

(e) a means for shielding said conductive lead wire from environmental influences of temperature, atmosphere, humidity and external electrical noise, said means for shielding comprised of a metal foil wrapping within a non-conductive container.

(f) a means for applying a voltage across said workpiece and said capacitive sensor means; and (g) a means connected to said lead wire for measuring capacitance effected across said workpiece and said capacitive sensor means.

17. In a stylus probe for a co-ordinate measurement machine, said machine including a multiple axis carriage, said probe adapted to be carried on said carriage for determining surface topography information about an associated workpiece, wherein the improvement comprises:

(a) an elongated stylus probe means formed of a rigid, elongated, hollow tubular member with a connecting-end and a tip-end;

(b) a mounting means for mounting said connecting-end of said stylus probe means to said multiple axis carriage of said co-ordinate measurement machine;

(c) a capacitive sensor means for measuring capacitance between said probe and a topographical feature of an associated workpiece, said sensor mounted on said tip-end of said stylus probe;

(d) a conductive lead wire connecting said capacitive sensor means, said wire conductively secured to said sensor means and extending through said probe to the co-ordinate measurement machine.

(e) a means for measuring environmental capacitance, said measuring means connected adjacent to said tip-end of said stylus probe;

(f) a means for subtracting a value of said environmental capacitance from a capacitance value of said capacitive sensor means.

18. A probe according to claim 17, wherein said means for measuring environmental capacitance is helically-shaped, said means positioned annular to the connecting-end of said probe.

19. In a stylus probe for a co-ordinate measurement machine, said machine including a multiple axis carriage, said probe adapted to be carried on said carriage for determining surface topography information about an associated workpiece, wherein the improvement comprises:

(a) an elongated stylus probe means formed of a rigid, elongated, hollow tubular member with a connecting-end and a tip-end;

(b) a mounting means for mounting said connecting-end of said stylus probe to said multiple axis carriage of said co-ordinate measurement machine;

(c) an elastomer material positioned against and between said mounting means and said tubular member at said connecting-end portion of said probe, said elastomer being compressed by deflection of said probe and then rebounding, thus having a dampening effect on vibrations of said probe.

(d) said elastomer further comprising a first segment and a second segment, said segments placed in annular contact with said mounting means and said tubular member, said first and second segments axially separated, said first segment more proximally located to said connecting-end.

20. A probe according to claim 19, wherein said elastomer is a member of a group consisting of polyureas, polyimides, natural rubber, styrene-butadiene random co-polymers (SBR), polyisoprene, neoprene rubber, polybutadiene, polychloroprene, polybutene, polyurethane rubber, silicone rubber, thiokol rubber, thermoplastic polyesterurethanes and polyureas, thermoplastic polyetherurethanes and polyureas, styrene-butadiene block co-polymers, ethlene-propylene co-polymers and terpolymers, and blends and mixtures thereof.

* * * * *